Figure 1:
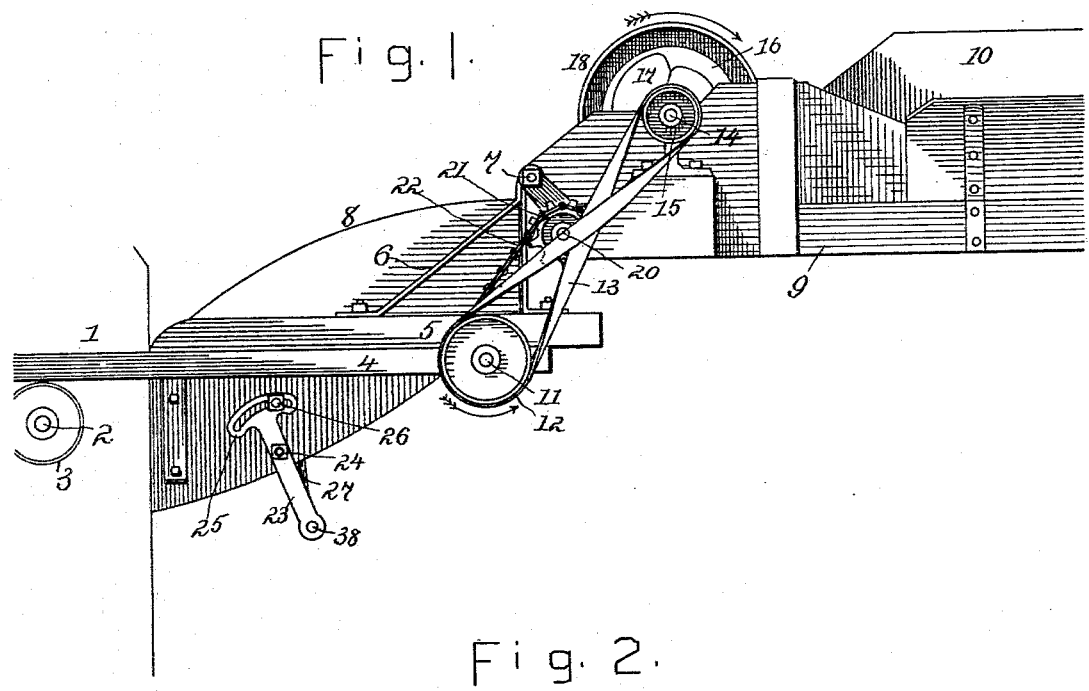

(No Model.) 2 Sheets—Sheet 1.

J. W. KINROSS.
BAND CUTTER AND FEEDER.

No. 511,242. Patented Dec. 19, 1893.

ATTEST.
Helen Graham
William Graham

INVENTOR
John W. Kinross.
by his attorney
L. P. Graham (No Model.) 2 Sheets—Sheet 2.
J. W. KINROSS.
BAND CUTTER AND FEEDER.
No. 511,242. Patented Dec. 19, 1893.
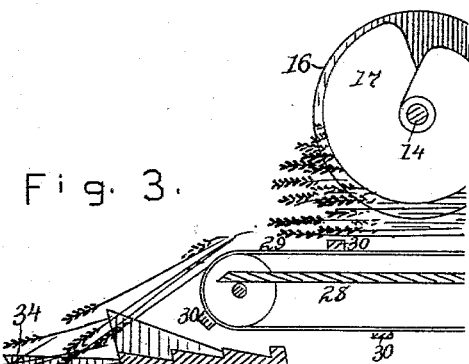
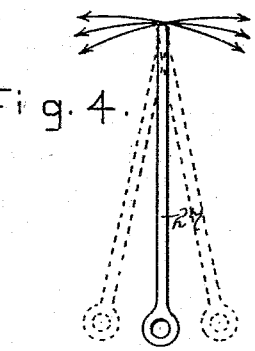
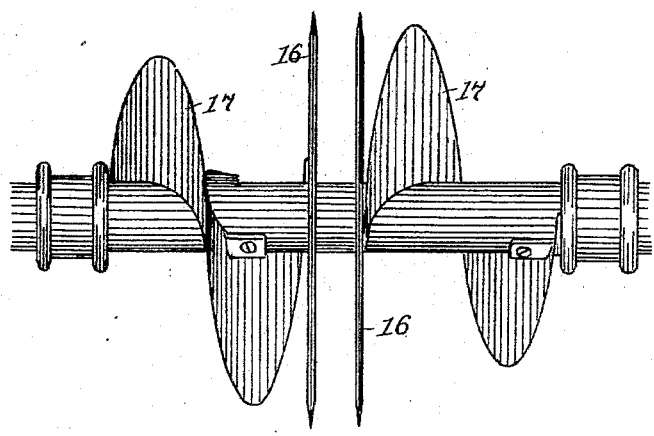
ATTEST.
Helen Graham
William Graham
INVENTOR
John W. Kinross.
by his attorney
L. P. Graham

UNITED STATES PATENT OFFICE.

JOHN W. KINROSS, OF SPRINGFIELD, ILLINOIS.

BAND-CUTTER AND FEEDER.

SPECIFICATION forming part of Letters Patent No. 511,242, dated December 19, 1893.

Application filed March 17, 1892. Serial No. 425,269. (No model.)

*To all whom it may concern:*

Be it known that I, JOHN W. KINROSS, of Springfield, in the county of Sangamon and State of Illinois, have invented certain new and useful Improvements in Band-Cutters and Feeders, of which the following is a specification.

This invention is designed to cut the bands of bound grain, spread the loose grain both sidewise and lengthwise, and feed it to the thrasher cylinder in substantially the manner of hand feeding.

It is also designed to feed the grain freely when the conditions are favorable to such operation, and to retard tangled bunches, &c., until the action of the thrasher cylinder and feed mechanism shall have made proper separation.

The band cutting mechanism consists of rotary cutters, preferably disk-formed, set at right angles to the bands of the bundles, as such bundles are supplied to the conveyer of the feeder, the cutters being above the conveyer and having rotation in a direction to strike downward against the approaching bundles.

The mechanism for spreading the grain sidewise consists of tapering spirals mounted on the cutter shaft with their large ends adjoining the cutters and their small ends extended oppositely along the shaft. They are preferably arranged reversely, or in opposite positions with relation to the circumference of the shaft, the large end of one starting from one side of the shaft and the large end of the other starting from the other side of the shaft. There are preferably two pairs of cutters and accompanying spiral spreaders, each pair occupying a separate compartment or division of the primary conveyer. The lateral spreaders, by their opposite arrangement with relation to the shaft and consequent dissimultaneous action, tend to distribute the grain lengthwise to some extent, but the greater part of the longitudinal distribution is effected by the feed frames, which receive the grain from the conveyer and present it to the thrasher cylinder. These frames are three in number, when two cutters are used, and their division is such that the grain from each compartment will fall in part on a side frame and in part on the central one. The frames incline downward toward the thrasher cylinder, their upper surfaces are serrated or terraced, they have parallel toothed strips rising from their surfaces at approximately equal intervals, and the lower teeth of the strips are lengthened into retarding and tearing fingers. Partition bars are placed between adjacent edges of the feed frames, and each frame is carried at its upper end on an independent and differently extended crank of a common drive shaft, while its lower end is sustained by an oscillating arm having an adjustable pivot.

Figure 2:
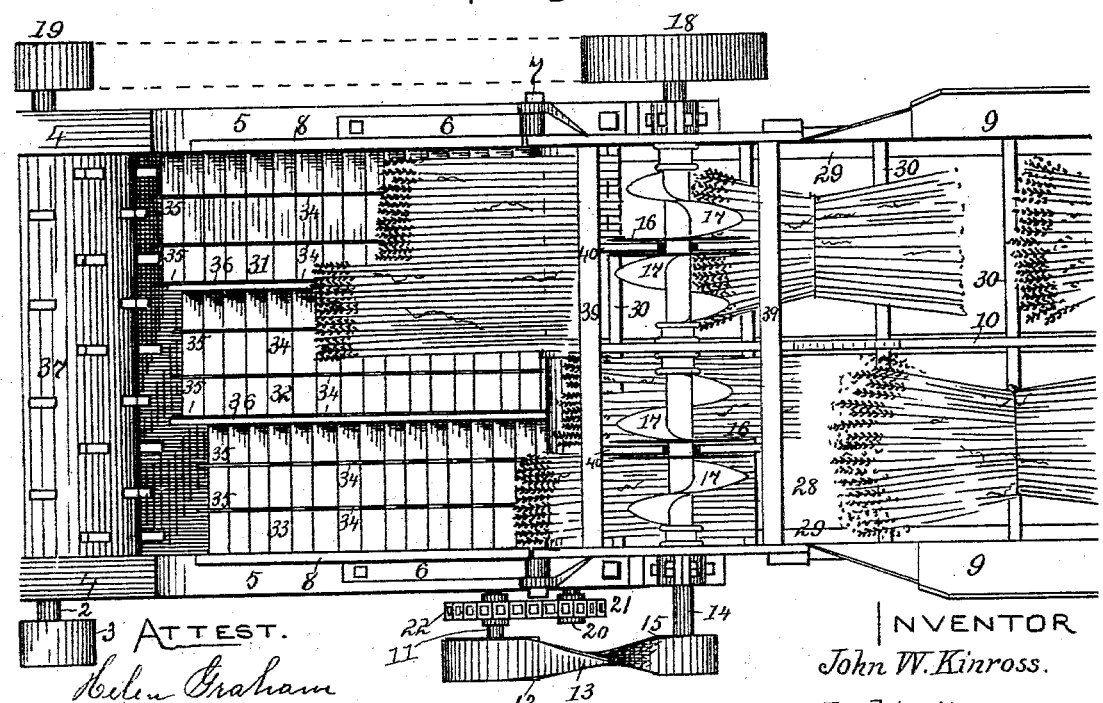

In the drawings accompanying and forming a part of this specification, Figure 1 is a side elevation of my device. Fig. 2 is a plan of the same with operative parts uncovered. Fig. 3 is a longitudinal vertical section through a feed frame. Fig. 4 is a diagram of the rocking supports of the lower ends of the feed frames, showing the different effects obtainable by adjustment of the pivot. Fig. 5 is an enlarged representation of the band cutting and laterally spreading mechanism.

The receiving end of a thrasher is indicated at 1.

At 2 is seen the cylinder shaft, and 3 is a pulley by which the cylinder is driven. The bars 4 of the thrasher frame project from the thrasher and sustain bars 5 of the feeder. Straps 6 rise from bars 5 and form pivotal connections for the frame 9 of the cutter and spreader. Side boards 8 are secured to the bars 5 in a detachable manner. They guide the grain through the feeder when in position and their removal permits the frame 9 to be swung over onto the thrasher preparatory to going on the road.

The frame 9 is divided into two compartments by longitudinal partition 10, and cutting and spreading mechanisms are provided for each compartment as will hereinafter appear. The shaft 11 is cranked in three different directions, and is provided with a pulley 12 and with a sprocket wheel obscured in the drawings by such pulley. Belt 13 connects pulley 12 with pulley 15 on shaft 14 of the cutter and spreader shaft. The cutters 16 are arranged in adjacent pairs, as seen in Fig. 5, and they are preferably but not necessarily of circular disk conformation.

The spreaders 17 are tapering spirals, secured directly to their supporting shaft. Their large ends are next the cutters and they start from opposite sides of their shaft as shown. Their peripheries may be sharpened if desired, to assist the cutters in severing bands.

The cutter shaft has a pulley 18 driven from pulley 19 of the cylinder shaft, and the motion of the cutter shaft is imparted to crank shaft 11 by belt 13. Conveyer shaft 20 has a sprocket wheel 21 which is driven from the crank shaft by means of chain 22. Straps 23 are pivoted at 24 one on each side of the feeder casing, and they have heads 25 in which are slots concentric with the pivots. Bolts 26 extend through the slots and provide means for securing the straps in different positions of adjustment. A shaft 38 is carried by the swinging ends of the straps, and on such shaft are pivoted the rocking supports 27 of feed frames 31, 32 and 33. These frames are each mounted on a different crank of the crank shaft the cranks forming angles of one hundred and twenty degrees with each other and the forward throw of each is in a different time from each of the others. Their upper surfaces are serrated or terraced as seen in Fig. 3 and they are each provided with rigid toothed strips 34 attached to their separating partitions. The lower tooth of each strip is elongated in the form of thin plate fingers 35 in such manner as to tend to retard tangles or bunches which from any reason may not have been properly separated before reaching the lower ends of the feed frames, and to tear such tangles or bundles to pieces while feeding them to the cylinder.

The conveyer bed is seen at 28.

At 29 are seen belts provided with slats 30 which extend across the conveyer frame and carry the bundles of grain to the cutters and spreaders. A frame composed of cross bars 39 and connecting bars 40 prevents the grain from being carried above the cutter shaft.

The cylinder of the thrasher is seen at 37.

The operation of the device is fairly well indicated by Figs. 2 and 3 of the drawings and is as follows: Bundles are supplied to opposite compartments of the conveyer in regular alternation, so far as practicable, and are therefore in such succession presented to the different cutters and spreaders. The disks cut the bands in an obvious manner, and the spirals act from the centers of the bundles outward, spreading the grain in both directions. The large end of each spreader penetrates the bundles deeply and gives motion to a great part of one half of each bundle, but as the grain moves it passes gradually from the influence of the larger end to that of the smaller and is consequently spread evenly over the surface of the conveyer. The spreaders move more rapidly than the conveyer, and as their arrangement is such that one acts in a different time from the other, one half of each bundle acted on is advanced a little earlier than the other as seen in Fig. 3. The grain from each compartment falls in part on a side frame and in part on the central frame, thus taking a preliminary step toward longitudinal distribution. The feed frames act dissimultaneously as before explained, and the grain is scattered out and pitched intermittently toward the cylinder. When the fingers 35 are reached the grain, if properly separated, will pass to the cylinder without interruption, but if in any wise tangled or bunched it will be held by the fingers until torn apart by the intermittent action of the feed frames coupled with the drawing-in action of the cylinder teeth. The partitions 36 between the feed frames do not partake of the motion of the frames, and their function is to assist in distributing the grain while keeping it straight on the feeders. The upper ends of the feed frames have one motion continuously, but their lower ends may be made to move variously in order to modify the action of the fingers to suit different conditions of grain. If the pivot of the rock arms be placed under the center of the swing of the arms, as indicated in solid lines in Fig. 4, the lower ends of the feed frames will move nearly in a horizontal plane. If the pivot be moved toward the cylinder the ends of the feeders will pitch upward with increasing retarding effect, applicable to badly tangled grain, while if the pivot be moved from the cylinder the feeders will pitch downward in a desirable manner to feed headed grain.

I claim—

1. The combination with a band cutter, of spiral spreaders consisting of plates of tapering width starting from opposite sides of the cutter shaft and extending taperingly along and secured directly to the shaft in opposite directions from the cutters.

2. The combination of two band cutter compartments, and three feeder frames each having independent motion, the feeder frames being so disposed with relation to the band cutter compartments that grain from each compartment will fall in part on a side feed frame and in part on the central feed frame.

3. The combination of the feed frames having serrated surfaces, the stationary partitions separating the frames, and the toothed strips rising from the frames and terminating at their lower ends in retarding fingers, consisting of thin plates standing on their edges.

4. The combination of the feed frames mounted at their upper ends on the diversely extended cranks forming angles of one hundred and twenty degrees with each other on the crank shaft, oscillatory supports extending downward from the lower extensions of the frames and pivoting on a transverse shaft, and pivoted straps 23 having slotted heads and means for shifting the position of the shaft.

5. The combination of the feed frames, rock arms 27 supporting the lower ends of the frames pivotally and pivoting on shaft 38, and straps 23 on opposite sides of the feed frame casing carrying shaft 38, pivoting at 24, and having the slotted head 25 by means of which and a securing bolt the position of shaft 38 may be varied.

In testimony whereof I sign my name in the presence of two subscribing witnesses.

JOHN W. KINROSS.

Attest:
L. C. SHELLABARGER,
E. S. McDONALD.